(12) United States Patent
Kesselgruber

(10) Patent No.: US 7,494,131 B2
(45) Date of Patent: Feb. 24, 2009

(54) ASSEMBLY FOR A CHASSIS STABILIZING SYSTEM

(75) Inventor: Dirk Kesselgruber, Köln (DE)

(73) Assignee: TRW Automotive GmbH (DE)

( * ) Notice: Subject to any disclaimer, the term of this patent is extended or adjusted under 35 U.S.C. 154(b) by 517 days.

(21) Appl. No.: 10/924,762

(22) Filed: Aug. 24, 2004

(65) Prior Publication Data

US 2005/0166750 A1    Aug. 4, 2005

(30) Foreign Application Priority Data

Aug. 25, 2003    (DE)    ............................ 203 13 104 U

(51) Int. Cl.
*B60G 17/005* (2006.01)

(52) U.S. Cl. .................. 280/5.502; 267/64.12

(58) Field of Classification Search .................. 280/5.5, 280/5.502, 5.501, 5.511, 124.106, 124.107, 280/124.152, 124.16; 267/64.28, 64.12, 267/277, 259

See application file for complete search history.

(56) References Cited

U.S. PATENT DOCUMENTS

| | | | | |
|---|---|---|---|---|
| 4,625,993 A | * | 12/1986 | Williams et al. | .......... 280/5.507 |
| 4,919,440 A | * | 4/1990 | Tsukamoto | ............... 280/5.502 |
| 5,015,009 A | * | 5/1991 | Ohyama et al. | ............ 280/5.52 |
| 5,217,245 A | * | 6/1993 | Guy | ..................... 280/124.152 |
| 5,299,488 A | * | 4/1994 | Kadlicko et al. | .......... 91/363 A |
| 6,053,509 A | | 4/2000 | Izawa et al. | |
| 6,533,294 B1 | * | 3/2003 | Germain et al. | .......... 280/5.511 |
| 7,055,832 B2 | * | 6/2006 | Germain | .................. 280/5.508 |

FOREIGN PATENT DOCUMENTS

| | | |
|---|---|---|
| DE | 34 42 879 | 5/1986 |
| DE | 37 05 520 | 9/1988 |
| DE | 42 93 010 | 11/1993 |
| DE | 38 89 328 | 11/1994 |
| DE | 195 01 136 | 7/1996 |
| DE | 693 06 550 | 5/1997 |
| DE | 198 14 690 | 11/1998 |
| DE | 699 04 112 | 10/2003 |
| EP | 0 963 868 | 12/1999 |
| WO | 93/15924 | 8/1993 |
| WO | WO02/083439 | * 10/2002 |

* cited by examiner

*Primary Examiner*—John Q. Nguyen
*Assistant Examiner*—Drew J. Brown
(74) *Attorney, Agent, or Firm*—MacMillan, Sobanski & Todd, LLC

(57) ABSTRACT

An assembly including a fluid pressure actuator, which has a guide part and an active part movable relative thereto, and a fluid pressure source which is in communication with the fluid pressure actuator in order to supply the latter with fluid which is under pressure, is characterized in that a locking device is provided which can interrupt the connection of the fluid pressure actuator with the fluid pressure source, that a control unit is provided which controls the locking device, and that the fluid pressure actuator is provided with a sensor by means of which the control unit can determine the position of the active part relative to the guide part.

18 Claims, 2 Drawing Sheets

ASSEMBLY FOR A CHASSIS STABILIZING SYSTEM

SEQUENCE LISTING

Not Applicable

CROSS REFERENCE TO RELATED APPLICATION

Figure 1:
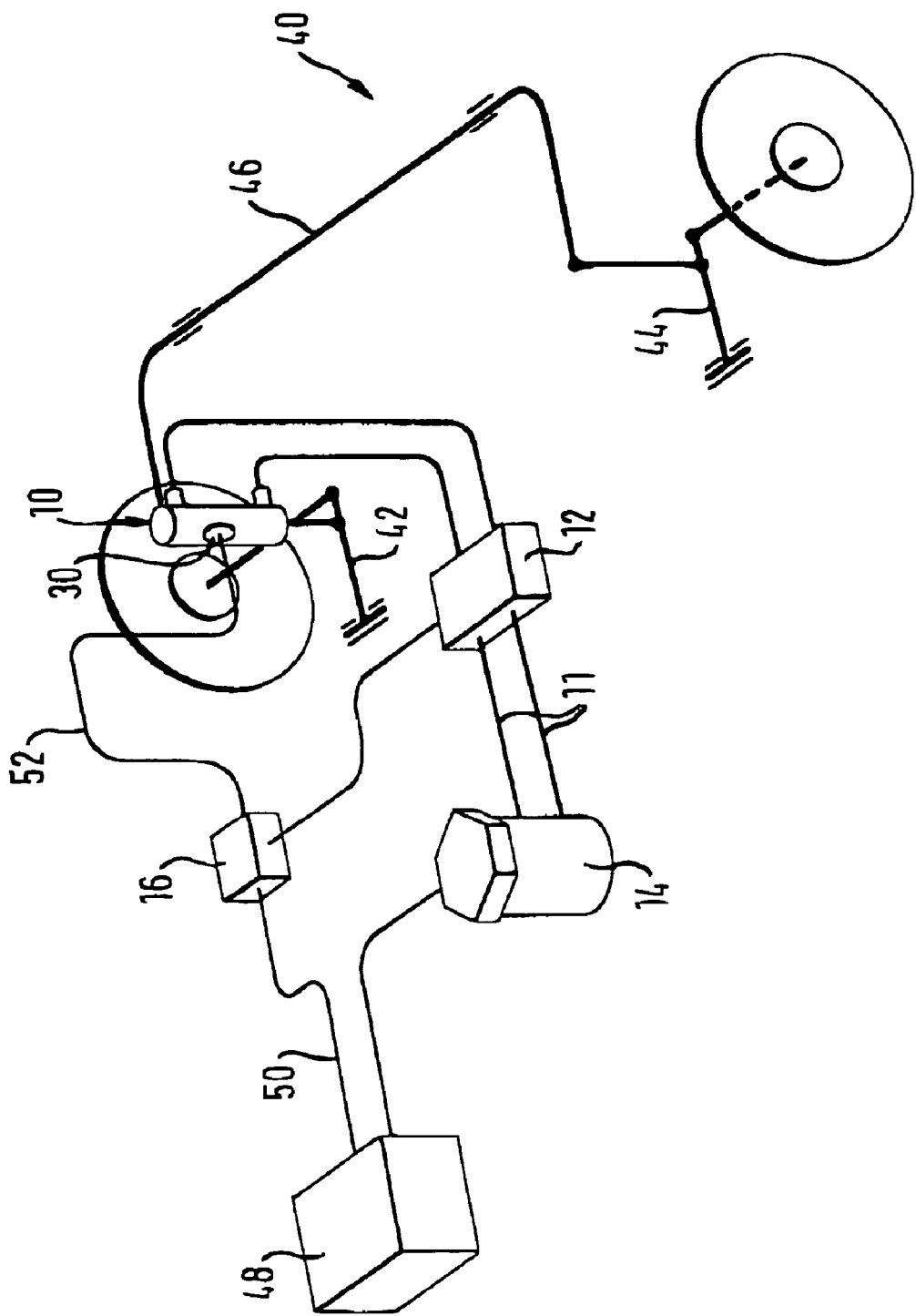

This application claims priority to German Application No. 203 13 104.5 filed Aug. 25, 2003, the disclosures of which are incorporated herein by reference.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The invention relates to an assembly for a chassis stabilizing system, comprising a fluid pressure actuator, which has a guide part and an active part movable relative thereto, and a fluid pressure source, which is in communication with the fluid pressure actuator, in order to supply the latter with fluid which is under pressure. The invention further relates to a chassis stabilizing system for a vehicle comprising a chassis and such an assembly.

2. Description of Related Art Including Information Described Under 37 CFR 1.97 and 1.98

Chassis stabilizing systems serve to improve the traveling comfort and also traveling safety. By means of the actuator, the chassis characteristics are altered as a function of vehicle parameters and traffic situation, by for example transverse stabilizers or other movable parts of the wheel suspension being prestressed or relieved or otherwise altered in their position. This leads to a characteristic of the vehicle adapted to the respective traffic situation, such as for instance improved road traction when driving around bends or in other, extreme situations.

BRIEF SUMMARY OF THE INVENTION

The invention provides an assembly which can be placed into a fail-safe state in the case of a fault.

For this purpose, in an assembly of the type initially mentioned, a locking device is provided, which can interrupt the connection of the fluid pressure actuator with the fluid pressure source, and a control unit which controls the locking device, the fluid pressure actuator being provided with a sensor by means of which the control unit can determine the position of the active part relative to the guide part. The proposed construction allows the actuator to be placed into a defined state in the case of a fault, for example on failure of the fluid pressure source, and for it to be blocked there. The blocking of the actuator can take place by interrupting the fluid pressure supply, an interruption only being carried out when it has been established by means of the sensor that the actuator is in a defined state.

According to a second aspect, the invention provides a chassis stabilizing system which in the case of a fault can be placed into a fail-safe state.

This is achieved by a chassis stabilizing system for a vehicle with a chassis and an assembly of the above-mentioned type, in which the guide part is connected with a first chassis element and the active part is connected with a second chassis element, and the active part can alter the position relative to the guide part by action with the fluid which is under pressure, in order to alter the characteristics of the chassis. This can serve to purposefully drive the actuator on failure of a system component such that the chassis is placed into a fail-safe state. This fail-safe state is distinguished in that the chassis reacts as if no chassis stabilizing system were present. In an extreme traffic situation, the vehicle can be handled better in such a fail-safe state than if the chassis characteristics were altered by a false setting of the actuator, i.e. adapted to a traffic situation which is not currently given.

Figure 2:
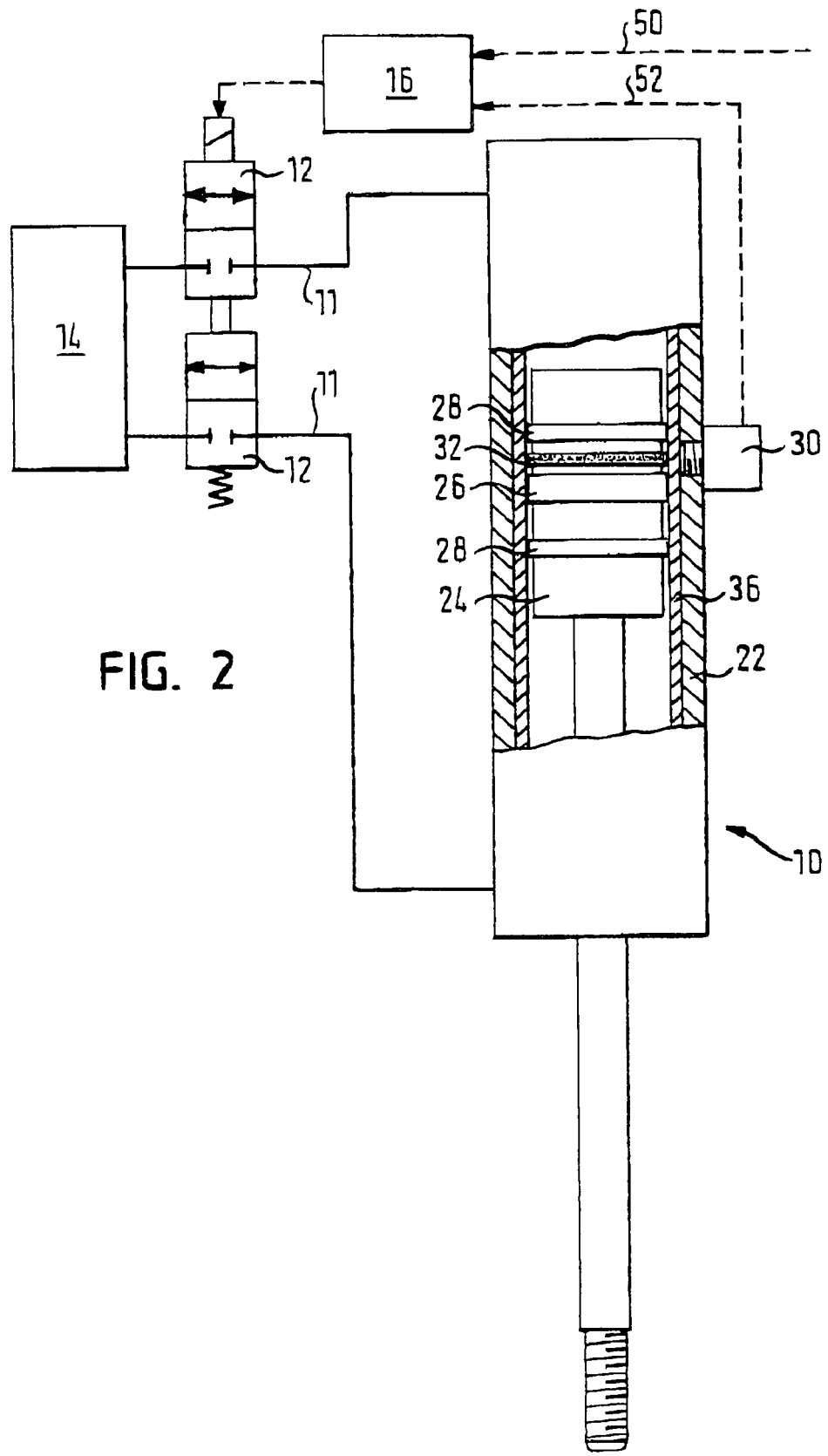

The invention is described in detail below with the aid of a preferred embodiment. Here, reference is made to the enclosed drawings, in which:

FIG. 1 shows a diagrammatic view of a chassis stabilizing system according to the invention and FIG. 2 shows a diagrammatic view of an assembly according to the invention.

In FIG. 1 a chassis stabilizing system according to the invention can be seen, which has an assembly according to the invention and a chassis, only the rear axle of which is illustrated in the drawing.

The assembly, which is illustrated in more detail in FIG. 2, has a linear actuator 10, which is connected via fluid pressure lines 11 and locking members 12 with an energy source, for example a fluid pressure source 14. The fluid pressure source 14 serves to supply the actuator 10 with fluid which is under pressure. In addition, a control unit 16 is provided for controlling the locking members 12.

In the present embodiment, the actuator is formed by a hydraulic cylinder 10, the cylinder wall 22 of which constitutes a guide part and the piston 24 of which constitutes an active part. The piston 24 has piston rings 26, 28, which form a seal 26 and guides 28, so that the piston 24 can slide smoothly in the cylinder. In the cylinder wall 22, a sensor is provided in the form of a Hall sensor 30, which responds to a magnet ring 32 housed in the piston 24.

The rear axle comprises a wheel suspension 40, as is known from the prior art, with a right longitudinal control arm 42, a left longitudinal control arm 44 and a transverse stabilizer 46, one end of which engages the left longitudinal control arm and the other end of which is connected via the actuator 10 with the right longitudinal control arm 42. Here, for example, the cylinder wall 22 can be connected with the transverse stabilizer 46, which forms a first chassis part, whereas the piston 24 is connected with the right longitudinal control arm 42, which forms a second chassis part.

The hydraulic cylinder 10 can be acted upon by the pressure fluid source 14, constructed as a hydraulic pump, with fluid which is under pressure, in the form of hydraulic oil, in order to move the piston 24 in the one or the other direction from a neutral position. Thereby, the transverse stabilizer 46 can be braced by the actuator 10, in order to alter the chassis characteristics. In the embodiment described, this brings about a bracing of the transverse stabilizer of the wheel suspension, in order for example to correct the lateral inclination of the vehicle when traveling around a bend. The extent and the direction of the bracing are regulated by a system control apparatus 48, in order for example to realize an active roll stabilization, as is known from the prior art. The function of such a roll stabilization and its effects on the physics of travel are sufficiently known from the prior art and are therefore not described further here.

The central position of the piston 24 is the neutral position of the hydraulic cylinder 10, in which the hydraulic cylinder 10 does not influence the characteristics of the chassis, i.e. the transverse stabilizer 46 of the wheel suspension is not prestressed in this neutral position; in this state, the chassis characteristics correspond to a passive chassis without roll stabilization. The magnet ring 32 and the Hall sensor 30 are arranged here such that the sensor 30 detects the central position of the piston 24 with respect to the cylinder wall 22.

Two locking members 12 in the form of solenoid valves are connected into the pressure fluid lines 11, which are formed here by hydraulic lines, between the hydraulic pump 14 and the hydraulic cylinder 10, which locking members 12 are preferably coupled mechanically or electrically, so that only one control means is necessary. The locking members 12 can cut off the supply of pressurized hydraulic oil from the energy source 14, in order to block the hydraulic cylinder 10. Such a blocking may be necessary for example if a leak occurs in the hydraulic system, or in the case of another malfunction of a vehicle system, which makes it necessary to put the vehicle stabilizing system, in particular the hydraulic cylinder 10, out of operation.

The control unit 16 can trigger a blocking of the hydraulic cylinder 10 when it receives a corresponding signal 50 from another control apparatus, for example from the system control apparatus 48 of the chassis stabilizing system or of a system which monitors the hydraulic supply. The control unit 16 can also be equipped with an arrangement by which it can monitor the hydraulic supply itself.

By a blocking of the hydraulic cylinder 10, the chassis stabilizing system is put out of operation, so that the chassis now behaves as if the stabilizing system were not present. In the present example, the right and left longitudinal control arms 42, 44 would be firmly connected with each other via the transverse stabilizer 46 of the wheel suspension.

In order that the chassis characteristics correspond to a chassis without stabilizing system, the hydraulic cylinder 10 may however only be blocked in its neutral position. Otherwise, through the blocking of the energy supply, a return of the hydraulic cylinder into its neutral position would be prevented. Therefore, the control unit 16 is additionally provided with an arrangement which allows it to evaluate the signal 52 from the Hall sensor 30.

The hydraulic lines 11 remain connected unblocked until the piston 24 has reached the central position. The hydraulic cylinder 10 is not forced into the central position under the expenditure of energy, but rather it reaches its neutral position independently, for example through the mechanical restoring force of the transverse stabilizer. The control unit 16 only switches the locking members 12 when it establishes by means of the sensor 30 that the piston 24 has reached the central position. Thereby it is ensured that even in the case of a failure of the energy supply 14, the fail-safe state can be reached.

The construction of the sensor as Hall sensor 30 with the corresponding magnet ring 32 allows a non-contact detection of the position of the piston 24.

Advantageously, a thin sliding bush 36 is provided between piston 24 and cylinder wall 22, so that the piston rings 26, 28 are not damaged by the edges of the sensor 30 or of the bore in which it is housed.

Of course, the construction of the actuator as hydraulic cylinder 10 is to be understood as being only by way of example. The invention can also be applied to systems with other actuators, for example pneumatic cylinders.

The locking members 12 are preferably integrated in the actuator or its housing, or arranged thereon so that no lines are necessary between the locking member and the actuator, which could form additional weak points (e.g. due to leakage).

The invention claimed is:

1. A chassis stabilizing system for a vehicle comprising:
   a chassis including a first chassis element and a second chassis element; and
   an assembly comprising:
   a fluid pressure actuator, which has a guide part and an active part movable relative thereto, and
   a fluid pressure source which is in communication with the fluid pressure actuator in order to supply the latter with fluid under pressure to move the active part relative to the guide part, wherein:
   a locking device is provided which can be selectively operated to interrupt the connection of the fluid pressure actuator with the fluid pressure source and thereby prevent movement of the active part relative to the guide part,
   a control unit is provided that is responsive to a fault and to a defined position of the fluid pressure actuator for operating the locking device, and
   the fluid pressure actuator is provided with a sensor by means of which the control unit can determine the defined position of the fluid pressure actuator, the guide part being connected with the first chassis element, and the active part being connected with the second chassis element, and the active part being able to alter its position relative to the guide part by action with the fluid under pressure, in order to alter the characteristics of the chassis.

2. The chassis stabilizing system according to claim 1, wherein the chassis has at least one wheel suspension with at least one transverse stabilizer, the transverse stabilizer being able to be braced by means of the actuator, in order to alter the chassis characteristics.

3. The chassis stabilizing system according to claim 1, wherein the active part can assume a neutral position, in which the actuator leaves the chassis unaffected, it being able to be established by the sensor when the active part is in this neutral position.

4. The chassis stabilizing system according to claim 3, wherein the neutral position is a central position of the active part in relation to the guide part.

5. The chassis stabilizing system according to claim 1, wherein the actuator is a hydraulic cylinder, the cylinder wall of which forms the guide part and the piston of which forms the active part.

6. The chassis stabilizing system according to claim 5, wherein the sensor is mounted to the cylinder wall.

7. The chassis stabilizing system according to claim 5, wherein a sliding bush is provided between the cylinder wall and the piston.

8. The chassis stabilizing system according to claim 1, wherein the sensor is a magnet sensor which reacts to a magnet mounted to the active part.

9. The chassis stabilizing system according to claim 8, wherein the magnet sensor is a Hall sensor.

10. The chassis stabilizing system according to claim 1, wherein the locking device is integrated in the actuator.

11. The chassis stabilizing system according to claim 1, wherein the locking device comprises at least one solenoid valve.

12. The chassis stabilizing system according to claim 1, wherein the locking device comprises a pair of valves which are mechanically or electrically coupled so as to be operated by a single control means.

13. An assembly comprising:
- a fluid pressure actuator, which has a guide part and an active part movable relative thereto, and
- a fluid pressure source which is in communication with the fluid pressure actuator in order to supply the latter with fluid under pressure to move the active part relative to the guide part, wherein:
- a locking device is provided which can be selectively operated to interrupt the connection of the fluid pressure actuator with the fluid pressure source and thereby prevent movement of the active part relative to the guide part, and
- a control unit is provided that is responsive to a fault and to a defined state of the fluid pressure actuator for operating the locking device, wherein the control unit operates the locking device only when the active part is in a neutral position relative to the guide part.

14. The assembly according to claim 13, wherein the locking device is integrated in the actuator.

15. The assembly according to claim 13, wherein the neutral position is a central position of the active part relative to the guide part.

16. The assembly according to claim 13, further including a magnet that is connected to the active part for movement therewith relative to the guide part, and wherein a magnet sensor reacts to movement of the magnet.

17. The assembly according to claim 13, wherein the actuator is a hydraulic cylinder, the cylinder wall of which forms the guide part and the piston of which forms the active part, and a sliding bush is provided between the cylinder wall and the piston.

18. An assembly comprising:
- a fluid pressure actuator, which has a guide part and an active part movable relative thereto, and
- a fluid pressure source which is in communication with the fluid pressure actuator in order to supply the latter with fluid under pressure to move the active part relative to the guide part, wherein:
- a locking device is provided which can be selectively operated to interrupt the connection of the fluid pressure actuator with the fluid pressure source and thereby prevent movement of the active part relative to the guide part, and
- a control unit is provided that is responsive to a fault and to a defined state of the fluid pressure actuator for operating the locking device, wherein the defined state of the actuator is a neutral position that provides a non prestressed state on at least one of a first chassis element and a second chassis element engaging at least one of the guide part and the active part.

* * * * *